United States Patent [19]

Burgdorf et al.

[11] Patent Number: 4,543,791
[45] Date of Patent: Oct. 1, 1985

[54] POWER BRAKE UNIT

[75] Inventors: Jochen Burgdorf, Offenbach-Rumpenheim; Helmut Steffes, Eschborn, both of Fed. Rep. of Germany

[73] Assignee: ITT Industries, Inc., New York, N.Y.

[21] Appl. No.: 626,478

[22] Filed: Jul. 2, 1984

Related U.S. Application Data

[63] Continuation of Ser. No. 310,350, Oct. 13, 1981, abandoned.

[30] Foreign Application Priority Data

Oct. 29, 1980 [DE] Fed. Rep. of Germany ....... 3040602

[51] Int. Cl.[4] ............................................. B60T 13/20
[52] U.S. Cl. .......................................... 6/550; 60/567; 60/581
[58] Field of Search .................. 60/547.1, 550, 567, 60/581, 582

[56] References Cited

U.S. PATENT DOCUMENTS

| 4,244,185 | 1/1981 | Belart | 60/550 |
| 4,263,784 | 4/1981 | Steffes | 60/550 |
| 4,341,076 | 7/1982 | Steffes | 60/547.1 |

FOREIGN PATENT DOCUMENTS 2615805 10/1977 Fed. Rep. of Germany ........ 60/551

Primary Examiner—Abraham Hershkovitz
Attorney, Agent, or Firm—James B. Raden; William J. Michals

[57] ABSTRACT

A power brake unit for automotive vehicles comprising a valve adapted to meter fluid from an energy source into a booster chamber to act upon a booster piston arrangement. The booster piston arrangement includes a first booster piston and a second booster piston with the second booster piston being inoperative in the event of failure of the energy source. If the energy source fails, the pedal force is directly and mechanically transmitted from the brake pedal to the master cylinder piston via the first booster piston.

2 Claims, 4 Drawing Figures

POWER BRAKE UNIT

This application is a continuation of application Ser. No. 310,350, filed Oct. 13, 1981, now abandoned.

BACKGROUND OF THE INVENTION

The present invention relates to a power brake unit for automative vehicles comprising a brake valve which is adapted to meter pressure fluid from an auxiliary energy source into a booster chamber, the booster chamber being isolated from an intermediate pressure chamber by an axially displaceable booster-piston arrangement including a first booster piston and a second booster piston. The second booster piston is axially slidable relative to the first booster piston, the sliding motion being limited by a stop, and the second booster piston is held at a maximum axial distance from the first booster piston in the actuating direction of both booster pistons by a means. The intermediate pressure chamber, on the one hand, is bounded by a master-cylinder piston or an intermediate piston coupled thereto, and a hydraulic transmission ratio effective between the brake pedal and the master-cylinder piston is disconnectible dependent on the pressure of the auxiliary energy source.

Such a power brake unit is disclosed in U.S. Pat. No. 4,263,784, issued Apr. 28, 1981, and includes an auxiliary piston rigidly coupled through a yoke to a first booster piston and is in turn guided in a cylindrical bore of the second booster piston.

The end face of the auxiliary piston and parts of the cylindrical bore combine to form a pressure chamber which is in communication with a pressure source via a radial bore of the second booster piston, via an annular chamber at the first booster piston and via a pressure fluid port. In the inactivated off position of the power brake unit, a booster chamber is connected to a return line through a valve integrated in the first booster piston, as a result of which the booster chamber is depressurized.

Upon the application of a force on the brake pedal, first a return port of the brake valve is closed and then the pressure fluid source is connected to the booster chamber. The pressure build-up in the booster chamber conditions a joint movement of both booster pistons, with the auxiliary piston which is partly guided in the second booster piston shifting a pressure cushion ahead of itself. The pressure fluid enclosed by the second booster piston is thus fed into the intermediate pressure chamber causing the intermediate piston to move away from the first booster piston and to actuate the master-cylinder piston.

If the auxiliary energy fails, the second booster piston remains in its position while the pressure fluid in its inside bore is supplied through the auxiliary piston to the fluid source. In a like case of failure, an actuation of the master-cylinder piston is safeguarded by a mechanical abutment of the first booster piston on the intermediate piston with the hydraulic transmission ratio being eliminated.

In the area of the second booster piston, the construction of the prior art power brake unit described above entails comparatively great expenses, since the bore accommodating the second booster piston, the inside bore of the second booster piston as well as the auxiliary piston guided therein are required to have a fine surface quality which demands costly machining operations.

SUMMARY OF THE INVENTION

It is, therefore, an object of the present invention to provide an improved power brake unit of the type referred to hereinabove so as to optimize the number of the individual components and the number of those surfaces requiring fine machining.

A feature of the present invention is the provision of a power brake unit for automotive vehicles comprising: a housing having therein first and second parallel bores, a booster chamber common to the first and second bores and an intermediate pressure chamber bounded on one side by a selected one of an intermediate piston coupled to a master cylinder piston and the master cylinder piston; an axially displaceable booster piston arrangement separating the booster chamber from the intermediate pressure chamber, the booster piston arrangement including a first booster piston disposed in one of the first and second bores, a second booster piston disposed in the other of the first and second bores and a means interconnecting the first and second booster pistons enabling the first booster piston to slide axially relative to the second booster piston, to provide a stop to limit the sliding motion, to provide a defined maximum axial distance between the first and second booster pistons in an actuating direction of the first and second booster pistons and to provide a positive engagement between the first and second booster pistons in a brake release direction independent of pressure from a pressure source; a valve disposed in the first booster piston to meter pressure fluid from the source into the booster chamber; and a hydraulic transmission ratio arrangement including the intermediate chamber effective between a brake pedal and the master cylinder piston, the transmission ratio arrangement being disconnectible upon failure of the pressure source.

It is advantageous in a power brake unit constructed this way not only to provide a straightforward construction but also the second booster piston will assume a defined rest postiion relative to the first booster piston in the brake's release position and also in the event of failure of the auxiliary energy. The second booster piston will also remain in its guide if the auxiliary energy fails in an actuating position and pressure fluid is displaced into the pressure fluid chamber by the intermediate pressure chamber being decreased.

In an expedient embodiment of the present invention, a compression spring is clamped between the booster pistons maintaining the second booster piston in abutment with the stop. The spring force constantly keeps the second booster piston in a maximum position relative to the first booster piston so that displacement of the second booster piston always takes place without lost travel. The second booster piston is also safely prevented from sliding out of its guide.

Particularly suitable from the point of view of construction is another advantageous embodiment wherein a piston rod is formed at the second booster piston which rod is radially guided in a bore at a yoke rigidly provided at the first booster piston. This way, a potential canting of the second booster piston is avoided even in the case of an unfavorable ratio between piston length and piston diameter.

If, in accordance with an improvement of the present invention, a compression spring is inserted between the yoke and the booster piston, the spring's position itself is defined by the elements moving in abutment therewith.

In a further advantageous embodiment, the piston rod is sealingly guided in the second booster piston, rigidly coupled to the yoke and provided with a stop element at its end close to the intermediate pressure chamber. This constructional measure is still another improvement of the guiding of the second booster piston because the piston length is usually greater than the axial extension of the yoke.

It is, furthermore, favorable to arrange a spring acting in the actuating direction between the second booster piston and the housing. This embodiment affords an easy assembly of the compression spring.

In a still further embodiment of the present invention, it is conceivable to form a rigid stop at the housing which abuts at the piston side close to the pressure chamber or at the push rod in the off position. All resilient elements become dispensable in this case.

BRIEF DESCRIPTION OF THE DRAWING

Above-mentioned and other features and objects of this invention will become more apparent by reference to the following description taken in conjunction with the accompanying drawing, in which.

DESCRIPTION OF THE PREFERRED EMBODIMENTS

Figure 1:
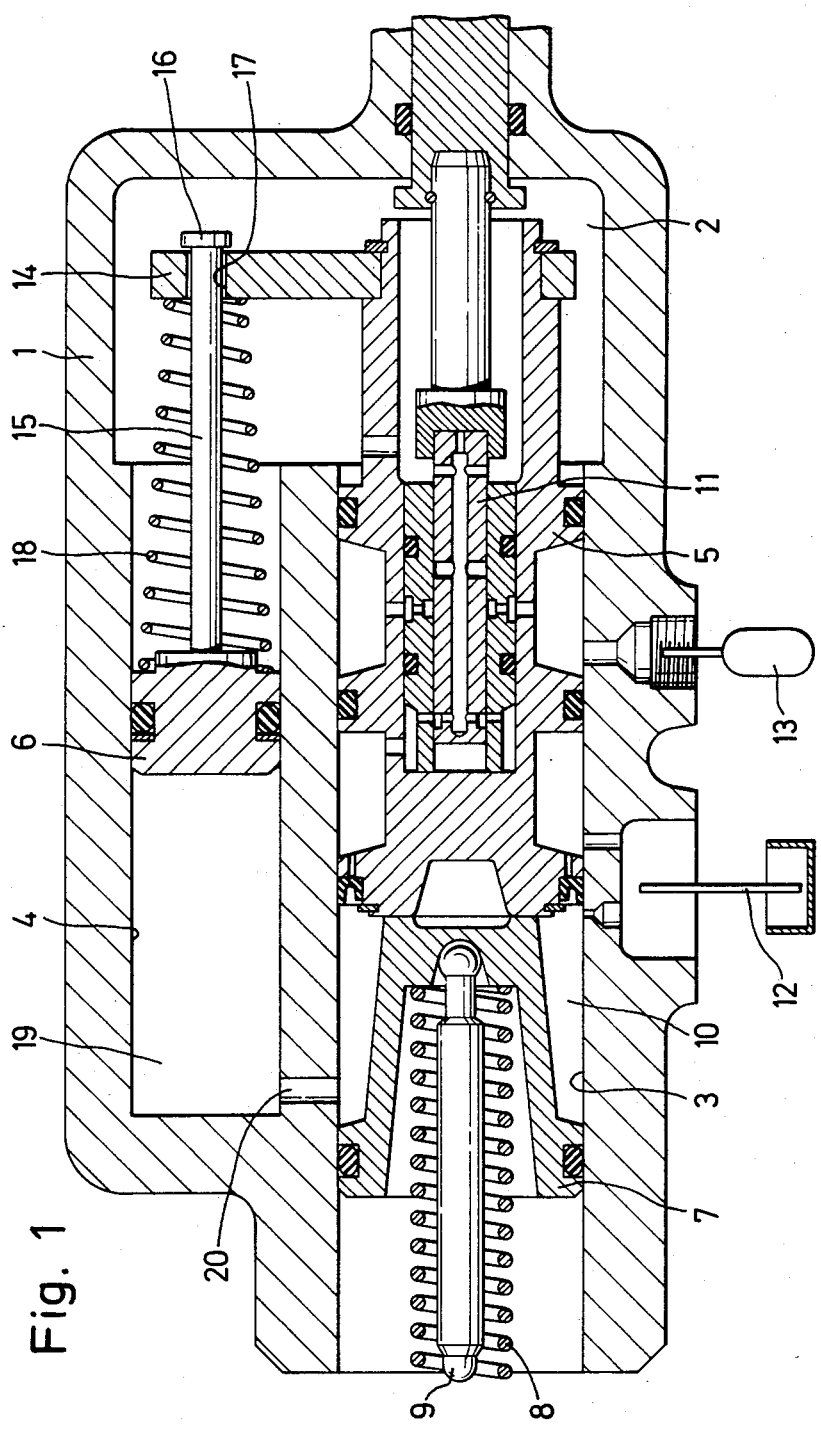
FIG. 1 is a longitudinal cross-sectional view of a power brake unit in accordance with the principles of the present invention.

Parts corresponding to each other have been assigned the same reference numerals in the various Figures of the Drawing.

Referring to FIG. 1, housing 1 includes a booster chamber 2 common to two parallel cylindrical bores 3 and 4 with a booster piston 5 guided in bore 3 and a booster piston 6 guided in bore 4. Accommodated in the first cylindrical bore 3 is also an intermediate piston 7 which is moved in abutment with the end face of the first booster piston 5 remote from booster chamber 2 by means of a compression spring 8 in the illustrated inactive position of the power brake unit. Intermediate piston 7 is also connected to a push rod 9 for actuation of a master-cylinder piston (not shown). An intermediate pressure chamber 10 is formed between intermediate piston 7 and first booster piston 5.

Arranged in an interior bore of first booster piston 5 is a valve 11 which establishes a connection between booster chamber 2 and a depressurized return line 12 in the inactive position shown, which interrupts this connection when a force acts on a non-illustrated brake pedal and which then establishes a connection between booster chamber 2 and a fluid source 13.

First booster piston 5 is connected with second booster piston 6 through a yoke 14 and a piston rod 15. Piston rod 15 has a stop 16 on an end thereof and projects through a bore 17, or a differently constructed opening of yoke 14, so that second booster piston 6, which is rigidly connected to piston rod 15, is permitted to immerse into the second cylinder bore 4 only by a defined amount relative to first booster piston 5. On the other hand, a sliding motion of bore 17 of yoke 14 is possible over piston rod 15 in the direction of second booster piston 6. A compression spring 18 is engaged between second booster piston 6 and yoke 14. An end face of second booster piston 6 combines with parts of second cylinder bore 4 to form a pressure chamber 19 connected to intermediate pressure chamber 10 through a cross bore 20.

The mode of operation of the power brake unit just described will be explained in more detail as follows. Upon the application of a force on valve 11, a pressure build-up takes place in booster chamber 2 causing displacement of both booster pistons 5 and 6 to the left in FIG. 1. The transmission of force to second booster piston 6 is effected via compression spring 18. Since the pressure in booster chamber 2 exceeds the pressure in pressure chamber 19, compression spring 18 is required to develop only part of forces required to overcome the friction forces of second booster piston 6 and, thus, can be constructed accordingly weak. In the event of booster pistons 5 and 6 moving as described, the pressure medium existing in pressure chamber 19 is displaced through cross bore 20 into intermediate pressure chamber 10 corresponding to the stroke of pistons 5 and 6 so that intermediate piston 7 lifts from first booster piston 5 and actuates the master-cylinder piston via push rod 9. With the pedal force being removed, the device will withdraw to its illustrated rest position, with the second booster piston 6 following stop 16 and yoke 14. As a result of a decrease of the pedal force, the pressure in booster chamber 2 will discharge through valve 11 until a new state of balance is attained.

If the brake pedal is applied after a failure of pressure source 13, no pressure build-up takes place in booster chamber 2. While second booster piston 6 maintains its initial position, first booster piston 5 displaces intermediate piston 7 in the direction of the master-cylinder piston, with bore 17 of yoke 14 sliding over piston rod 15 by overcoming the low force of compression spring 18. In such a case of failure, the hydraulic transmission ratio of the power brake unit described is ineffective, but actuation of the master-cylinder piston is safeguarded by the mechanical abutment of first booster piston 5 on intermediate piston 7.

Figure 2:
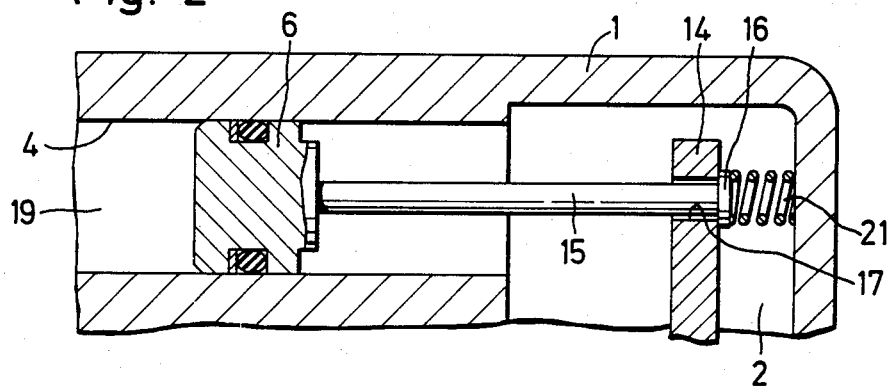
FIGS. 2-4 are partial longitudinal cross-sectional views of the second booster piston of the power brake unit of FIG. 1 illustrating other embodiments thereof.

In FIG. 2, compression spring 18 of FIG. 1 is replaced by a compression spring 21 having the same effect. Compression spring 21 is clamped between stop 16 of piston rod 15 and housing 1 and is rigidly connected to either one of housing 1 or stop 16. The one-sided fixation of compression spring 21 may, for instance, be performed by a spot-welding engagement. In the shown inactive position of second booster piston 6, compression spring 21 urges stop 16 in abutment with yoke 14 so that a maximum position relative to one another is adjusted between the booster pistons 5 and 6. When the brake is applied in the event of the auxiliary energy supply being intact, second booster piston 6 together with yoke 14 will be moved to the left, when viewing the drawing, with compression spring 21 being relieved from load and finally lifting from stop 16 or from housing 1 depending upon the fastening point chosen. Upon failure of the auxiliary energy, the master-cylinder piston will be actuated mechanically as has been described, with yoke 14 together with bore 17 sliding over piston rod 15. The volume of the fluid enclosed in pressure chamber 19 remains at a constant level, as a result of which the second booster piston 6 maintains its position or performs at most axial displacements, which need not be dealt with, but which can be compensated for by suitably dimensioning compression spring 21. Since second booster piston 6 is kept in its position, the hydraulic transmission ratio of the power brake unit will be ineffective in the event of failure of pressure source 13.

Figure 3:
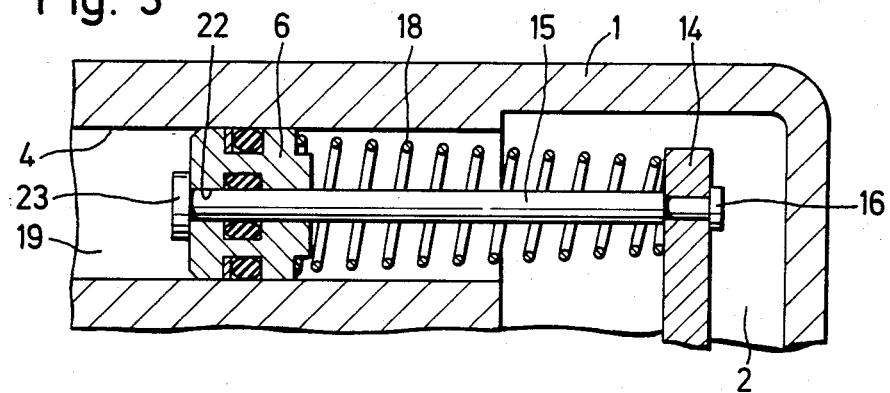

FIG. 3 shows a detail sketch of the power brake unit illustrated in FIG. 1 in the area of second booster piston 6. The compression spring 18 is again arranged between booster piston 6 and yoke 14. In this embodiment, the connection between push rod 15 and yoke 14 is constructed so as to inhibit a movement of yoke 14 and push rod 15 relative to each other. Second booster piston 6 includes a coaxial piston bore 22 wherein the end of piston rod 15 remote from yoke 14 is sealingly guided. Formed at the end of piston rod 15 close to pressure chamber 19 is a stop element 23 which limits the distance between yoke 14 and second booster piston 6 and is held in abutment with the end face of second booster piston 6 close to pressure chamber 19 in the inactive position illustrated. When the brake is applied, yoke 14 together with second booster piston 6 will move to the left, when viewing the drawing, corresponding to the magnitude of the pressure metered into booster chamber 2, until a state of balance between pedal force and the restoring force of the master-cylinder piston has been attained. During such a movement, stop element 23 remains in abutment with second booster piston 6. If the brake is applied and the auxiliary energy has failed, booster chamber 2 remains unpressurized. The pressure fluid enclosed in pressure chamber 19 prevents second booster piston 6 from travelling with yoke 14 to the left, when viewing the drawing. Rather a movement of second booster piston 6 relative to piston rod 15 starts, in the course of which stop element 23 lifts from second booster piston 6 and is immersed in pressure chamber 19 corresponding to the travel of yoke 14. In its turn, the comparatively weak dimensioning of compression spring 18 has as a result that the additional pedal force which the driver has to produce is as low as possible. Besides, the sealing material of piston bore 22 engaging at piston rod 15 hardly contributes to an increase of the pedal force required.

Figure 4:
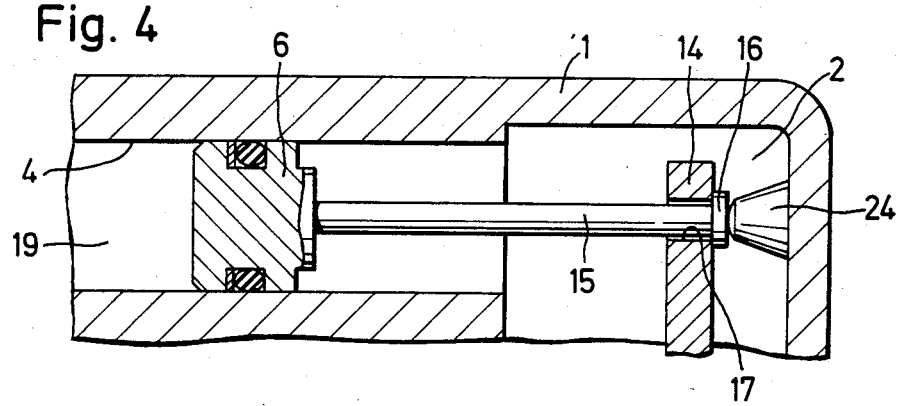

In the embodiment illustrated in FIG. 4, second booster piston 6 and piston rod 15 are again rigidly coupled to each other. Upon failure of the auxiliary energy, a movement of second booster piston 6 relative to yoke 14 can take place by bore 17 of yoke 14 sliding over piston rod 15. This embodiment includes a projection 24 formed in housing 1 bearing against stop 16 of piston rod 15 in the illustrated rest position. In addition, projection 24 causes a maximum distance between second booster piston 6 and yoke 14 in the brake's off position. When pressure fluid is introduced into booster chamber 2, second booster piston 6 will move in a known manner to the left, when viewing the drawing, until a state of balance has been attained corresponding to the pedal force applied. Upon failure of the auxiliary energy, second booster piston 6 is maintained in its position characteristic of the brake's off position by the fluid in chamber 19 and yoke 14 slides to a more or less great extent over piston rod 15 corresponding to the predetermined actuating force. In a further embodiment of the power brake unit, projection 24 of FIG. 4 is able to be formed at any point in housing 1 desired, at which a maximum axial distance between yoke 14 and second booster piston 6 is adjustable in the brake's release position.

While we have described above the principles of our invention in connection with specific apparatus, it is to be clearly understood that this description is made only by way of example and not as a limitation to the scope of our invention as set forth in the objects thereof and in the accompanying claims.

We claim:

1. A power brake unit for automotive vehicles comprising:

a housing having therein first and second parallel bore bearing booster pistons respectively therein, a booster chamber common to said first and second bores and an intermediate pressure chamber bounded on one side by an intermediate piston adapted to be coupled to a master cylinder piston and on the other side by a first of said booster pistons;

an axially displaceable booster piston arrangment separating said booster chamber from said intermediate pressure chamber, valve means for applying pressure to said chamber to move said piston arrangement, said booster piston arrangement including said first of said booster pistons disposed in one of said first and second bores, a second of said booster pistons disposed in the other of said first and second bores and means interconnecting said first and second booster pistons for movement of said pistons responsive to any actuating force applied to the booster pistons, said interconnecting means including a yoke affixed to said first booster piston for like movement therewith, a piston rod extending through said yoke for movement relative to said yoke, said piston rod affixed to said second booster piston, a compression spring bearing at one end against the second booster piston and at its other end against the inward side of said yoke to limit the movement of the second piston in response to movement of said first piston alone in a brake operating direction, and a stop on said piston rod externally of said yoke to provide a positive engagement between said first and second booster pistons in a brake release direction independent of pressure from a pressure source; and a hydraulic transmission ratio arrangement including said intermediate chamber effective between a brake pedal and the intermediate piston coupling to the master cylinder piston, said transmission ratio arrangement being disconnectable upon failure of said pressure source.

2. A power brake unit according to claim 1, in which said stop comprises a headed portion of said piston rod externally of the yoke.

* * * * *